(12) United States Patent
Piagentini et al.

(10) Patent No.: US 12,476,975 B2
(45) Date of Patent: Nov. 18, 2025

(54) CLOUD-BASED DYNAMIC ACCESS TO PRIVATE RESOURCES

(71) Applicant: Salesforce, Inc., San Francisco, CA (US)

(72) Inventors: Federico Piagentini, Buenos Aires (AR); David Oscar Rafaniello, Buenos Aires (AR)

(73) Assignee: Salesforce, Inc., San Francisco, CA (US)

( * ) Notice: Subject to any disclaimer, the term of this patent is extended or adjusted under 35 U.S.C. 154(b) by 181 days.

(21) Appl. No.: 18/126,768

(22) Filed: Mar. 27, 2023

(65) Prior Publication Data

US 2024/0333716 A1  Oct. 3, 2024

(51) Int. Cl.
H04L 9/40 (2022.01)

(52) U.S. Cl.
CPC ........ H04L 63/102 (2013.01); H04L 63/0272 (2013.01)

(58) Field of Classification Search
CPC .... H04L 63/102; H04L 63/0272; H04L 63/04
USPC ................................................. 726/4, 7, 12
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |

(Continued)

*Primary Examiner* — Kaylee J Huang
(74) *Attorney, Agent, or Firm* — Sterne, Kessler, Goldstein & Fox P.L.L.C.

(57) ABSTRACT

Methods, systems, and storage media are described for providing access to private resources such as in a Virtual Private Cloud (VPC) or in a database which is behind a Virtual Private Network (VPN). The solution involves configuring access to the privately owned resource, then using an integration platform to solve design operations or execute the full integration against the private resources. Ephemeral (short-term) or long-term connectivity can be provided.

20 Claims, 10 Drawing Sheets

(56) References Cited

U.S. PATENT DOCUMENTS

| | | |
|---|---|---|
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,130,935 B2 * | 9/2015 | Somani ............... H04L 63/0815 |
| 9,306,949 B1 * | 4/2016 | Richard ............... H04L 12/2859 |
| 9,753,758 B1 * | 9/2017 | Oldenburg ............ H04L 41/122 |
| 10,560,431 B1 * | 2/2020 | Chen ..................... H04L 63/18 |
| 11,163,768 B1 * | 11/2021 | Cruanes ................ G06F 9/5077 |
| 11,416,318 B1 | 8/2022 | Kraan Brun et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0013637 A1 * | 1/2011 | Xue ..................... G06Q 20/027 |
| | | 370/395.5 |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |

(56) References Cited

U.S. PATENT DOCUMENTS

| | | |
|---|---|---|
| 2013/0218949 A1 | 8/2013 | Jakobson |
| 2013/0218966 A1 | 8/2013 | Jakobson |
| 2013/0247216 A1 | 9/2013 | Cinarkaya |
| 2013/0304880 A1* | 11/2013 | Lin .................. H04L 41/08 |
| | | 726/4 |
| 2014/0359537 A1 | 12/2014 | Jackobson et al. |
| 2016/0094666 A1* | 3/2016 | Lindgren ............ H04W 76/14 |
| | | 370/225 |
| 2017/0054654 A1* | 2/2017 | Garg ................ H04L 41/0813 |
| 2017/0249763 A1* | 8/2017 | Garvey ................ G06T 11/206 |
| 2019/0319958 A1* | 10/2019 | Ocher .................... H04L 63/18 |
| 2019/0349405 A1* | 11/2019 | Bengtson .............. H04L 63/20 |
| 2021/0211403 A1* | 7/2021 | Robinson .............. H04L 67/565 |
| 2023/0385939 A1* | 11/2023 | Tsuchiyma ............ G06F 16/258 |

\* cited by examiner

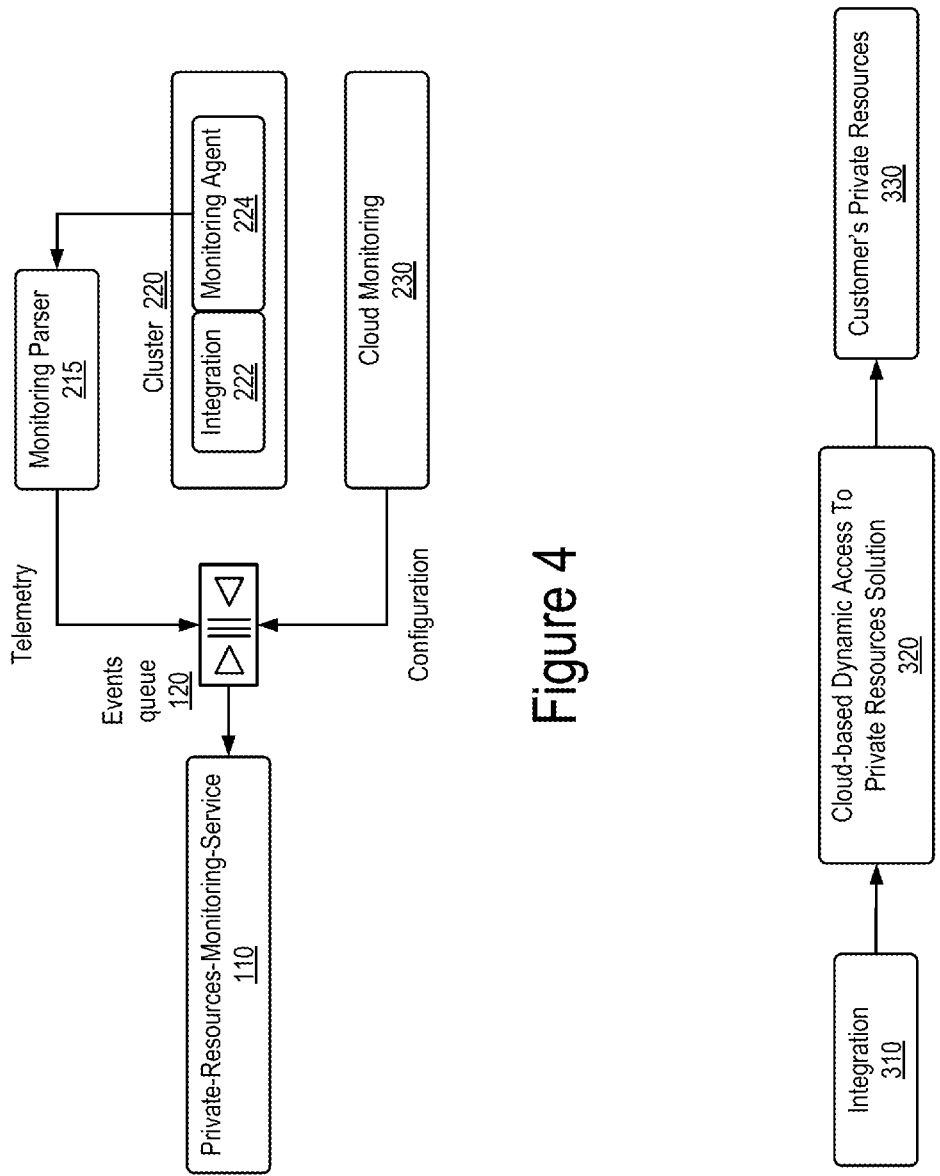

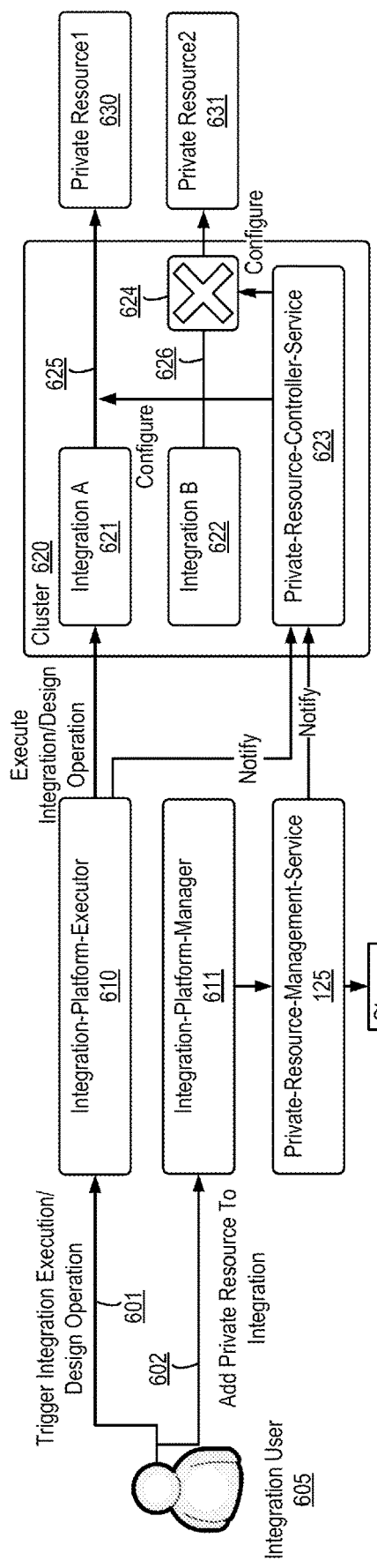
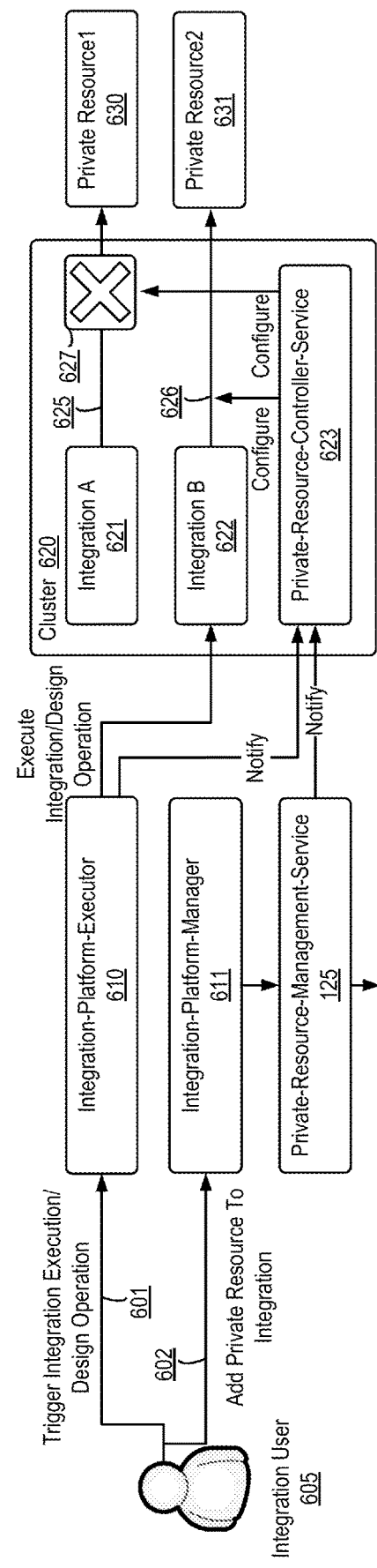
Figure 8A
Figure 8B

CLOUD-BASED DYNAMIC ACCESS TO PRIVATE RESOURCES

TECHNICAL FIELD

One or more implementations relate to accessing computer resources; and more specifically, to techniques for accessing private resources.

BACKGROUND ART

Various challenges are presented in accessing private resources in a computer network. Examples of private resources include a Structured Query Language (SQL) database behind a customer virtual private network (VPN), and an application programming interface (API) service in a customer's virtual private cloud (VPC).

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 4 is a functional block diagram of example monitoring service sources for the Private-Resource-Monitoring-Service 110 of FIG. 2, according to some example implementations.

FIG. 5 is a functional block diagram of an overview of a solution for accessing private resources, according to some example implementations.

FIG. 8A is a functional block diagram for cluster-level dynamic access to private resource management, where an Integration A is used to access or add a Private Resource1 while access to a Private Resource2 is blocked, according to some example implementations.

FIG. 8B is a functional block diagram for cluster-level dynamic access to private resource management, where an Integration B is used to access a Private Resource2 while access to a Private Resource1 is blocked, according to some example implementations.

DETAILED DESCRIPTION

Figure 1:
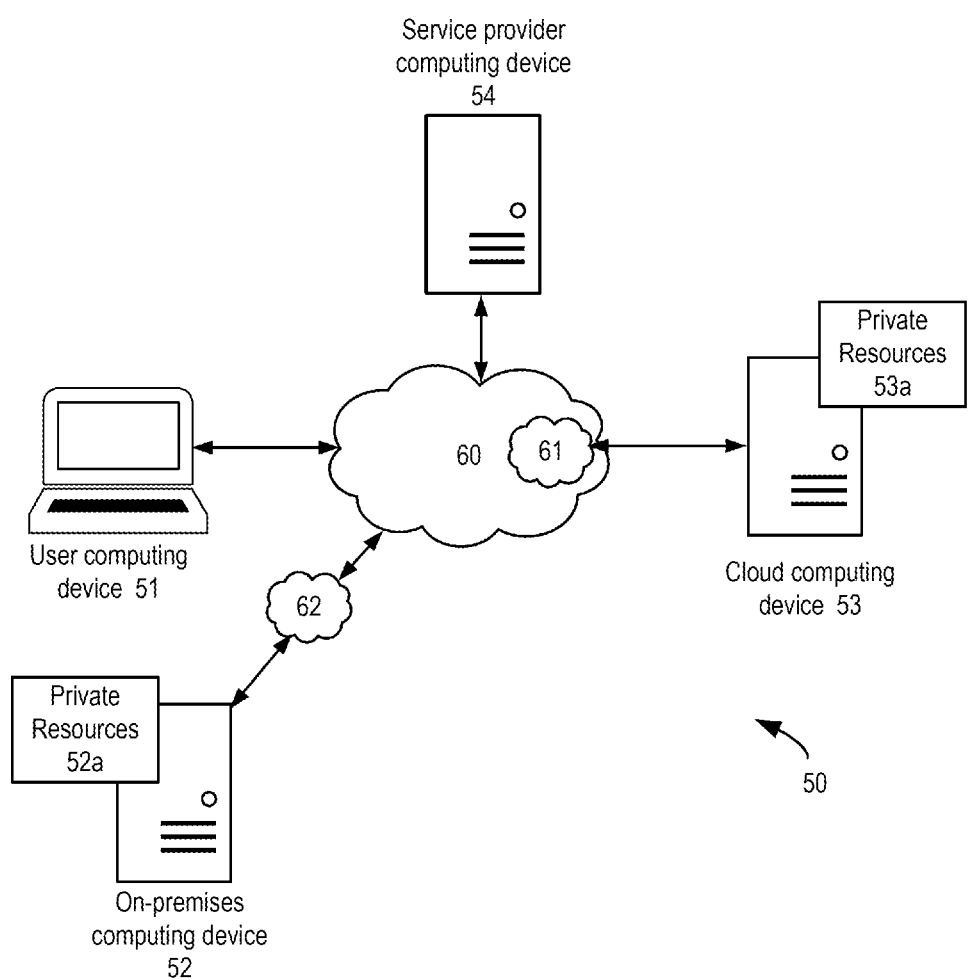
FIG. 1 is a block diagram of an example computing system 50 in which a user computing device can access private resources, according to some example implementations.

The following description describes technologies for accessing private resources in a computer network.

Private resources can include software, files or other data that are stored in a network for use by a particular user/customer. In one example, a virtual private network (VPN) is used to provide access to the resource. A VPN provides a secure, apparently private network using encryption over a public network, typically the Internet. In another example, private resources are stored in a virtual private cloud (VPC).

Private resources may be accessed via various integration platforms. An integration platform helps solve the problem of integration across different applications and their data. Example integration platforms are provided by companies such as Mulesoft, Boomi, Oracle and others.

For example, MuleSoft is a platform that allows an information technology (IT) department of a business to automate tasks including integrating data and systems, automating workflows and processes, and creating digital experiences. Integration allows information to be shared between connected systems. Implementations of the present disclosure may operate in conjunction with MuleSoft, as well as other integration tools that help provide connections to different services. References to MuleSoft or any other particular software application herein are simply for purposes of illustration, and implementations of the present disclosure may be implemented in conjunction with other suitable service integration tools or other software applications.

However, it can be inefficient to access the private resources when the integration requires use of an associated web server. For example, consider the example of the Composer tool in the MuleSoft platform. Composer is a no code, point-and-click integration tool that enables customers to connect different services such as applications and perform simple mapping and data transformation in what is a called a "Flow."

An example is a Zendesk (an example cloud-based help desk management solution) to Jira (an example project management tool) use case. When a Zendesk ticket is flagged for engineering review, a task can be created in Jira and the team notified via Slack (an example messaging application for business). The user first logs in to a Composer account that has been provisioned by their IT department. The user then clicks on "create new flow" to access a flow builder user interface (UI). Composer has pre-built connectors for common business use cases. A connector is software that enables connections to external systems and provides code for specific design operations. For example, a Salesforce or other customer relationship management/CRM software connector can be configured to authenticate and make requests to the Salesforce/other CRM software API.

The flow builder UI allows the user to select a system where an event will trigger a flow. Example systems/services include Salesforce (or other CRM program), Workday (or other financial management software), Asana (or other project management software), Box (or other content management software), Google Sheets (or other a spreadsheet program), Google Calendar (or other calendar program), Stripe (or other online payment software), ServiceNow (or other IT management software), Zendesk (or other customer service software), NetSuite (or other business management software), Jira (or other project management software), Xero (or other online accounting software) and Quickbooks Online (or other online accounting software).

In this example, the user selects ZenDesk as the trigger and creates a connection to a ZenDesk account. The user configures a flow by choosing an event that starts the flow from a drop down menu. For example, the flow can be set to run when a ticket is created or updated. Next, the user selects a Jira action for creating a new task. In response, Composer will automatically fetch meta data from Jira and display fields to be mapped. This makes it easy to map data between different business applications. Composer also allows for conditional logic such as to send a Slack message to notify the product team of the Jura ticket if it was created successfully.

Composer is powered by Mulesoft Design Services (MDS), which is a serverless architecture.

Generally, a Flow is composed of steps defining the order of things to happen in the integration. Each step will represent a connection to a service which provides a click-only set of options that the customer configures to define what that step will do (e.g., CRM software→create a record of type "opportunity" with certain fields).

To enable customers to configure all steps, in the backend there are "Design Operations" being executed which trigger tasks. One example task is testing connectivity of a connection (e.g., validating if a set of credentials enable connecting to a system/private resource). This could involve a request having a section to identify which connector to test and another section with the credentials (and the fields where they need to be injected) in order to execute the design operation.

Another example task is autocompleting a drop-down menu of available record types or other options that may be useful for interacting with the system (e.g., a list of channels from a messaging/collaboration application such as Slack). Another example is metadata resolution. This can involve getting a description of fields and types that a given system accepts or returns in an interaction (e.g., a Salesforce/CRM opportunity domain object description with fields such as name and creation date).

Another example is sampling data. This can involve getting an example of what an action/operation will return (e.g., Slack showing a sample of user data next to an operation called "Get User Data" to give an idea of a sample result). A Design Operation can be any action desired by a user. These design operations require a runtime such as Mule Runtime to execute. However, a Mule Runtime, for instance, is an expensive solution since it involves web servers that require many resources to execute and a standalone context (e.g., a Docker container image).

Moreover, customers may either require the endpoint of public services when building their Flows (e.g., Salesforce, Google Calendar, etc.) or need to connect to private resources (e.g., a SQL Database behind a customer VPN, or an API Service in a customer private VPC).

However, it is challenging to enable the Composer platform or other integration platform to execute Design Operations and any integration against private resources, in a secure and cost effective manner. The various challenges include providing management, governance and monitoring of the life cycle of each private resource (e.g., which Flows use the private resource, response time, number of requests, error-rate, etc.). A further challenge is avoiding having to generate isolated infrastructure while being able to work over a multi-tenant solution. A further challenge is providing ephemeral, secure and inexpensive access to private resources.

A further challenge is generating an elastic network interface (ENI), PrivateLink and Network Load Balancer and others to build a bridge to a customer's private resources.

A further challenge is configuring network policies and/or AWS network access control lists (NACLs) to enable/disable access per pod/integration to the bridge in an ephemeral way. A NACL is an optional layer of security for a VPC that acts as a firewall for controlling traffic in and out of one or more subnets.

The solution provided herein provides a mix of software and infrastructure resources that address the above and other issues.

The solution provides a number of advantages. For example, it is compatible with Mule Runtimes and the MuleSoft Design Services (MDS) architecture or other integration software working in a multi-tenant environment. Additionally, the solution relieves a customer/user of the complexity of accessing their private resources. Further, the solution is cost-effective and overrides classical resource limitations (e.g., number of VPC peerings, etc.).

The above and other advantages will be further apparent in view of the following discussion.

A glossary of some useful terms is provided below.

API—An application programming interface is a set of rules defined by an application to interact with it through programming languages. An API may use records which hold data in fields. An API can be used to request a particular service, by following specific rules of the API. APIs can be provided by web applications such as Hypertext Transfer Protocol (HTTP).

Docker container image: a lightweight, standalone, executable package of software that includes everything needed to run an application: code, runtime, system tools, system libraries and settings. Container images become containers at runtime. A container is a standard unit of software that packages up code and all its dependencies so the application runs quickly and reliably from one computing environment to another.

ENI: An Elastic Network Interface is a logical networking component in a VPC that represents a virtual network card.

Integration Platform: A platform which enables users to create and deploy integrations between different service providers/applications and their data. An example of this (relevant to this proposal) is Composer. An integration platform connects an application to other applications, pushes data to them or pulls data from them, and orchestrates and executes workflows. This can be done, e.g., using APIs and webhooks.

Mule runtime: a runtime engine used to host and run Mule applications. It is similar to an application server. Mule runtimes can be provisioned on-premises and/or in the cloud. One Mule runtime can host several Mule applications.

NACL: A Network Access Control List allows or denies specific inbound or outbound traffic at the subnet level.

Network Policy: NetworkPolicies are an application-centric construct that allow a user to specify how a pod is allowed to communicate with various network "entities" over the network. One example is a Kubernetes Network Policy. Kubernetes is an open-source container orchestration system for automating software deployment, scaling, and management.

NLB: A Network Load Balancer functions at the fourth layer of the Open Systems Interconnection (OSI) model. It provides elastic load balancing, which automatically distributes incoming traffic across multiple targets.

Pod: may refer to a computing resource or group of computing resources, such as the hardware and software that make up a computer system as well as any software or device that can be accessed from that computer system.

Private Cloud Link: a highly available, scalable technology that enables a user to privately connect their VPC to services as if the services were in their VPC. As an example, Amazon Web Services (AWS) PrivateLink provides private connectivity between VPCs, supported AWS services, and on-premises computing devices (e.g., mainframe computer or physical server on customer's premises) without exposing customer traffic to the public Internet.

VPC: A Virtual Private Cloud is a virtual network dedicated to a cloud account (e.g., AWS, Google Cloud, etc.). It is logically isolated from other virtual networks in the cloud. A user can launch resources into their VPC such as by running code, storing data and hosting websites. A VPC is a secure, isolated private cloud hosted within a public cloud. A VPC may be a multi-tenant model.

VPC peering connection: a networking connection between two VPCs that enables routing of traffic between them using private IPv4 or IPv6 addresses.

Webhook—an HTTP-based callback function that allows lightweight, event-driven communication between two APIs. It is a mechanism by which a server can push data to an HTTP URL when an event occurs in an application.

Overview

An integration platform may provide two types of executions:
1. Ephemeral (short-term) Connectivity: With a product such as MDS (MuleSoft Design Services), Design Operations are executed against APIs for only a few seconds. Another use case for ephemeral connectivity is testing the integration under development a single time to see how it works (also known as "Test the integration"). Another use case is testing a user's login credentials to determine if they are valid. An ephemeral connection usually runs design operations where only small atomic pieces of the integration are executed, e.g., a portion of the integration is executed.
2. Long-term Connectivity: Once an integration is fully designed, the user may set the integration to run in an unlimited fashion. The integration may then execute constantly, every certain period of time, or as a consequence of an outside trigger. A long-term connection may be, e.g., 10×-100× or more longer in duration than a short-term connection. A long-term connection is longer in duration than a short-term connection. A long-term connection usually executes the entire integration, from trigger of the flow to the end. The long-term connection is used once the integration has fully been designed.

In either type of execution, the integrations need access to APIs and resources that, by default, need to be accessible publicly to function and solve the integrations. An example is incorporating a public API such as Salesforce or other CRM software and sending messages in a chat application such as Slack notifying specified users of a certain action.

A focus of the disclosed implementations is to provide a solution for when those APIs and resources cannot be accessed publicly, e.g., because they live in an internal or private network, in a separate cloud technology or for another reason that makes them inaccessible to the Internet. The solution aims to provide dynamic access to private resources from integrations (e.g., Mule Applications) running in a highly virtualized environment (e.g., Kubernetes), with options for ephemeral and permanent executions. This solution can work, e.g., in a highly multi-tenant environment which prioritizes high performance and low cost of execution.

In other words, the solution enables controlled and temporal access to a user's private resources for any integration process by leveraging multiple infrastructure pieces and some software elements.

Details

From the user point of view, the following steps may be used to enable integrations to access private resources:
1. Configuring access to the privately owned resource.
2. Use the Integration Platform to solve Design Operations or execute the full Integration against their private resources.

1. Configuring Access to the Privately Owned Resource

The user may configure a VPC peering if using the same technology as the one in the example solution (for example AWS Cloud pairing, or Google Cloud pairing) or configure access to their VPN so that the solution's infrastructure can have availability of them. Users do not need to handle this manually but they can fully interact with the solution, and provide the required details, in which case the connectivity will be solved for them.

A management user interface (UI) may be presented to provide full management capabilities over the private resources the user wants the solution to be able to access. This UI will allow the user to:
Instantly enable or disable access to their private resource.
Monitor current and historical usage of their private resource (e.g., API calls, error rate, response time, etc.).
See which integrations are currently using the private resource and allow/disallow access to specific integrations.
Deny permission given previously to an integration to access the private resource.

FIG. 1 is a block diagram of an example computing system 50 in which a user computing device can access private resources, according to some example implementations. The system includes a user computing device 51, an on-premises computing device 52, a cloud computing device 53, a service provider computing device 54, a public cloud 60, a VPC 61 within the pubic cloud, and a private network 62. A private network could be in an organization such as a company or school, while a public network could include the Internet, for example.

Four computing devices are depicted for simplicity. In practice, such networks could have many more computing devices. The user computing device 51 may be a laptop computer or personal computer (PC), and the devices 52, 53 and 54 may be servers, for instance. The on-premises computing device 52 may be on the premises of an organization associated with the user, for example. The on-premises computing device 52 and the cloud computing device 53 may store private resources 52a and 53a, respectively, of the user. A single user computing device is depicted as an example.

Figure 3A:
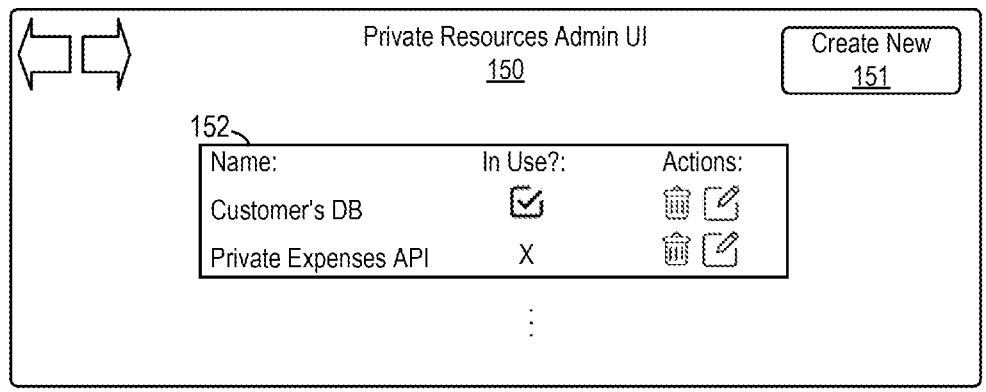
FIG. 3A is an example user interface of a Private Resource Administrator view, consistent with FIG. 2, according to some example implementations.
Figure 3B:
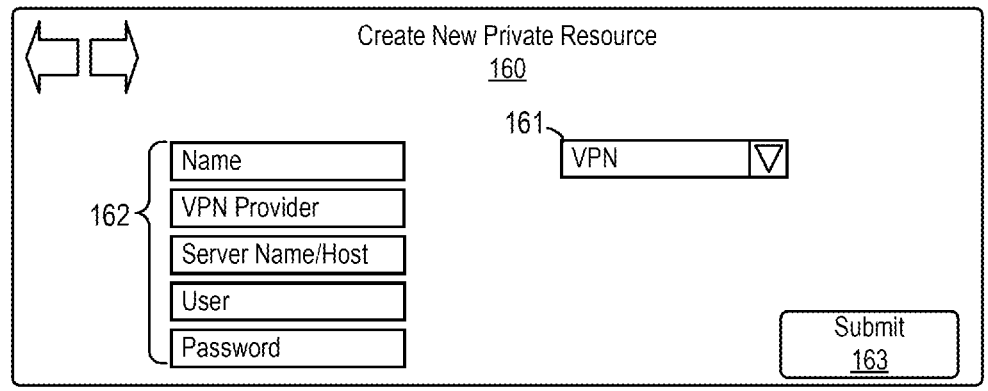
FIG. 3B is an example user interface of a creation page for private resources, consistent with FIG. 2, according to some example implementations.
Figure 3C:
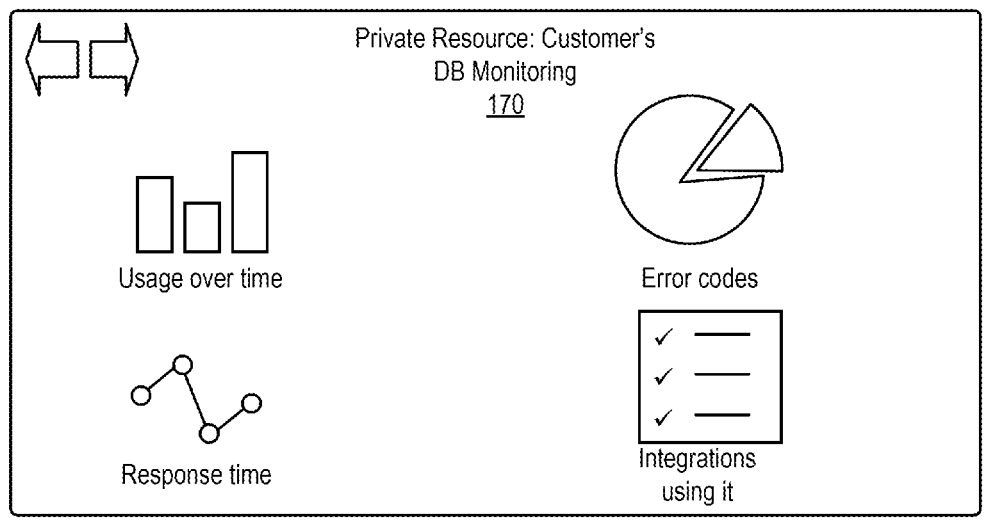
FIG. 3C is an example user interface for monitoring over a private resource, consistent with FIG. 2, according to some example implementations.

A user of the computing device 51 may interact with one or more user interfaces (UIs) to configure access to a private resource, obtain data stored on a private resource, and monitor activity of a private resource, such as depicted in the UIs of FIGS. 3A to 3C.

The computing devices can each include a memory and a processor, where the memory is to store instructions which are executed by the processor to perform the functions described herein. See also FIG. 11 for an example electronic device which could represent any of the computing devices of FIG. 1.

Figure 2:
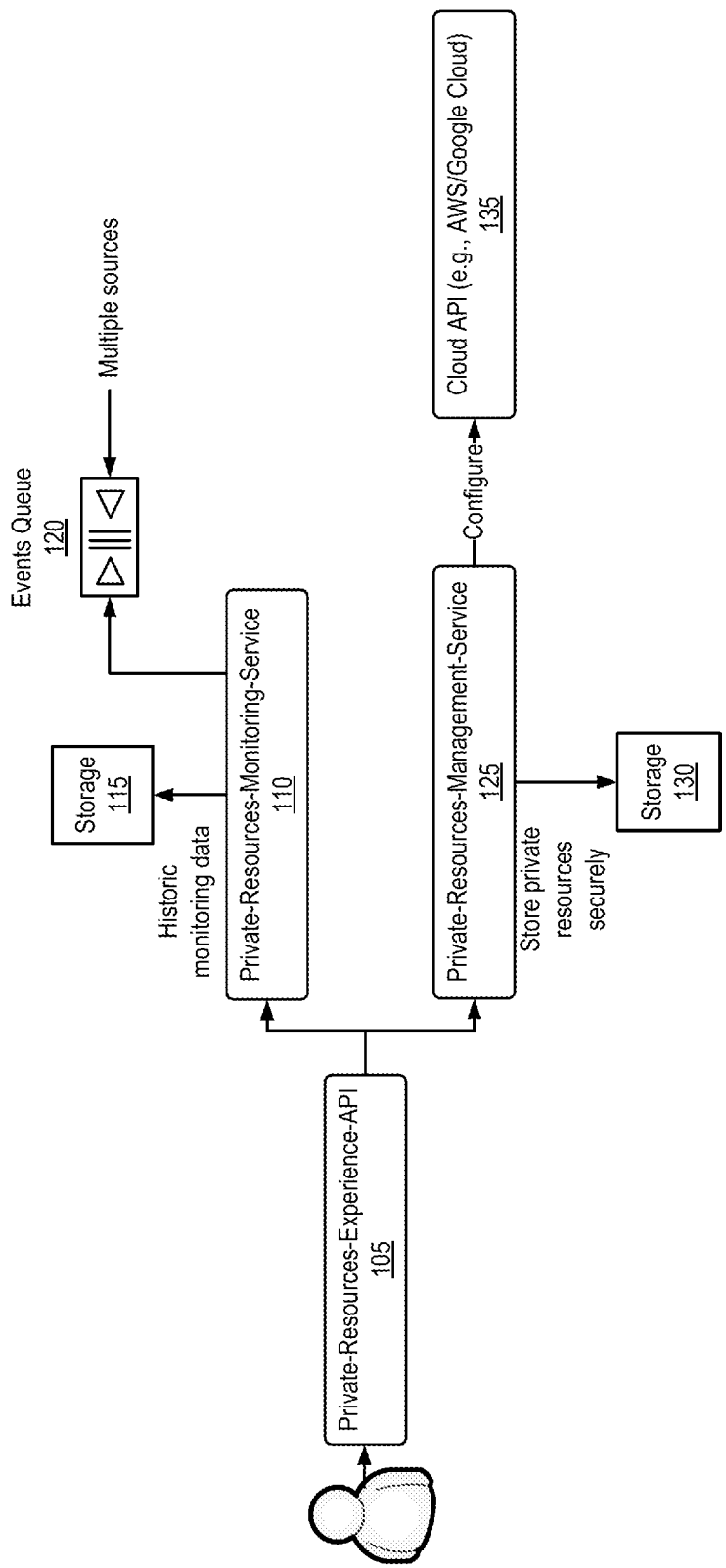
FIG. 2 is a functional block diagram of an example management system overview for managing access to private resources, according to some example implementations.

FIG. 2 is a functional block diagram of an example management system overview for managing access to private resources, according to some example implementations. The diagram describes the base services that serve the private resources management capabilities of the solution. The services include Private-Resource-Experience-API 105, Private-Resource-Monitoring-Service 110, Private-Resource-Management-Service 125 and Cloud API 135.

The Private-Resource-Experience-API 105 provides a single entry point to both CRUD (Create Read Update Delete) at a Private-Resource-Management-Service 125 and monitoring over the registered private resources at a Private-Resource-Monitoring-Service 110. The Private-Resource-Experience-API 105 can also provide a static UI to show all the capabilities of the system. See also FIGS. 3A to 3C.

The Private-Resource-Experience-API 105 can be used to, e.g., update and access a private resource, rename a database, and change to a different VPN. The Private-Resource-Experience-API 105 can provide information such as the number of requests generated, how many were successful and how many failed, what the response times are, whether a specific query is taking longer than others, and so forth.

The Private-Resource-Management-Service 125 provides an API which is able to register a new Private Resource and, in usage of that, it will access the configured Cloud API 135 (e.g., AWS/Google Cloud) and create all the required resources as described in diagrams below that are needed to enable connectivity. The associated storage 130 may hold the encrypted version of all required values such as the VPN configuration or VPC peering values. The storage 130 stores private resources securely.

The Private-Resource-Management-Service 125 provides the four CRUD functions, which are operations for creating and managing persistent data elements, mainly in relational and NoSQL databases. It is a reference for the private resources and may store information such as whether a customer has created access to a database, fields required to connect to the database, and how to access a private VPN or VPC. The Private-Resource-Management-Service 125 can also orchestrate the creation of all the required infrastructure, such as ENIs, NACLs, and network policies. For example, it may contact AWS and ask it to create a dedicated load balancer for a customer, and to configure a VPC peering. The Private-Resource-Management-Service 125 can also be in charge of deleting this infrastructure when it is no longer needed. The Private-Resource-Management-Service 125 is in charge of the lifecycle of the infrastructure resources.

The software may be executed in a cloud environment. In one possibility, it is executed within an environment such as Kubernetes in a cloud owned by a service provider. The service provider may be a company that is offering the service to customers as a business, for example.

The Private-Resource-Monitoring-Service 110 may consume, from an Events Queue 120, events related to private resources that are being used, and may parse and store such data so it can be consumed by the user. The Events Queue 120 may receive events from multiple sources. The Service 110 has an associated storage 115 for historic monitoring data. The data provided can include:

Number of times the private resource has been called.
Number of errors over the times called.
Response time of the user pay loads to the private resource.
Number of integrations with access to the private resource.
Number of integrations with the private resource link currently open/active (since it is ephemeral, an integration may have access to a private resource but may be inactive and not be currently using it).

FIG. 3A is an example user interface 150 of a Private Resource Administrator view, consistent with FIG. 2, according to some example implementations. In this UI, the customer gets access to CRUD actions over private resources and a quick view on their status, e.g., whether or not they are currently in use (e.g., accessed) by any integration. In a region 152, the UI lists example private resources such as a Customer's DB (database) and an API for Private Expenses. For each resource, the UI indicates whether the resource is in use (check mark) or not in use (X). Additionally, the UI allows actions to be performed such as deleting the resource (trash can) or editing the resource (pencil). The left and right arrows allow the user to move to different view of the UI.

FIG. 3B is an example user interface 160 of a creation page for private resources, consistent with FIG. 2, according to some example implementations. For the case of the VPN configuration, the UI shows the information to be input by the customer. For example, a set of fields 162 can be used to input information such as resource name, VPN provider, server name/host, user and password. A drop down menu 161 allows the user to select a type of the resource, such as VPN or VPC. A button 163 allows the user to submit their information.

FIG. 3C is an example user interface 170 for monitoring over a private resource, consistent with FIG. 2, according to some example implementations. In this case, the resource is the Customer's DB listed in the region 152 of FIG. 3A. The UI 170 may be reached by the user clicking on "Customer's DB," for example, in the UI 150. The UI shows different telemetry data points, including which integrations are currently using it and at what level each is used. This allows detecting any integrations misusage for example. The UI includes a bar chart for usage over time, a plot of response time over time, a pie chart of error codes and a list of integrations using the resource.

FIG. 4 is a functional block diagram of example monitoring service sources for the Private-Resource-Monitoring-Service 110 of FIG. 2, according to some example implementations. The multiple sources of events for the Events Queue 120 are obtained from telemetry of a Monitoring Parser 215 and from a configuration of a Cloud Monitoring Service 230. The Monitoring Parser is responsive to a Monitoring Agent 224 of an Integration Service 222 of a Cluster 220. In particular, the Events Queue 120 may be an asynchronous events queue which is fed by both the actual integration execution (e.g., via the telemetry) and the cloud monitoring. From the integration, the system can fetch live activity and telemetry of the private resource usage, and from the Cloud, the usage of the infrastructure resources can be seen.

II. Using the Integration Platform to solve Design Operations or execute the full Integration against their private resources. This is the second step to enable integrations to access private resources.

FIG. 5 is a functional block diagram of an overview of a solution for accessing private resources, according to some example implementations. The diagram depicts the main components of the proposed solution at a high level. A first component is an Integration component 310 which allows the customer to create an integration between different systems. This part may be hosted by any integration's platform and owned by the customer. A second component is Cloud-based Dynamic Access to Private Resources 320. This may be owned by the service provider and enables connectivity into the private resources. A third component is the Customer's Private Resources 330. This may be owned by the user/customer and lives in a private network, so that it is only reachable by the solution in a managed way.

Figure 6:
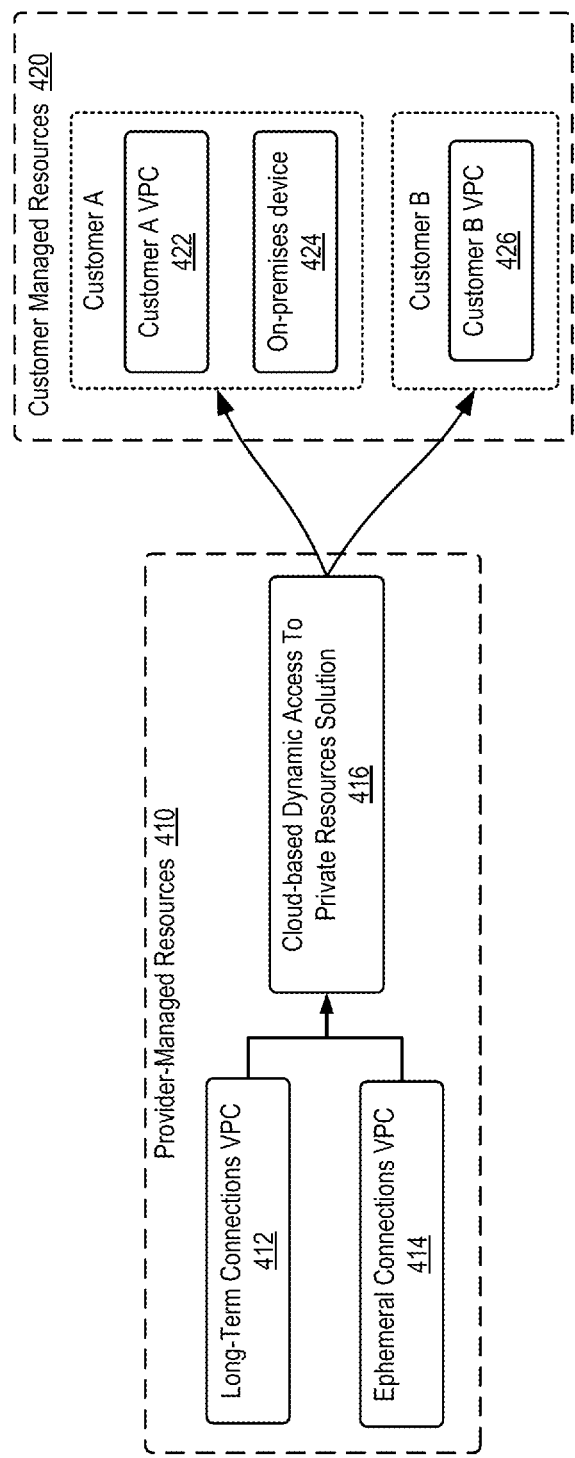
FIG. 6 is a functional block diagram of example use cases of a solution for accessing private resources, according to some example implementations.

FIG. 6 is a functional block diagram of example use cases of a solution for accessing private resources, according to some example implementations. The diagram depicts Provider-Managed Resources 410. These include a Long-Term Connections VPC 412 and Ephemeral Connections VPC 414, which both can provide outputs to a Cloud-Based Dynamic Access To Private Resource Solution 416. This Solution, in turn, can provide outputs to a first customer, Customer A, and a second customer, Customer B, in Customer Managed Resources 420). Customer A includes a Customer A VPC 422 and an on-premises device 424. Customer B includes a Customer B VPC 426. Two customers are depicted as an example, as one or more can be provided. Moreover, private resources could be associated with one or more VPCs and/or on-premises computing devices per customer.

In particular, the figure depicts the ephemeral use case, using the Ephemeral Connections VPC 414, where the integration may need access to the private resource for only a few seconds, and the long-term use case, using the Long-Term Connections VPC 412, where the integration may need access to the private resource in a more permanent/long-term way. On the customer side, two example scenarios of how they might maintain the private resources are discussed further in connection with FIG. 7. In a first scenario, the customer's private resource is a computing device on their premises, and in a second scenario, the customer's private resource is cloud-based, in a VPC.

Figure 7:
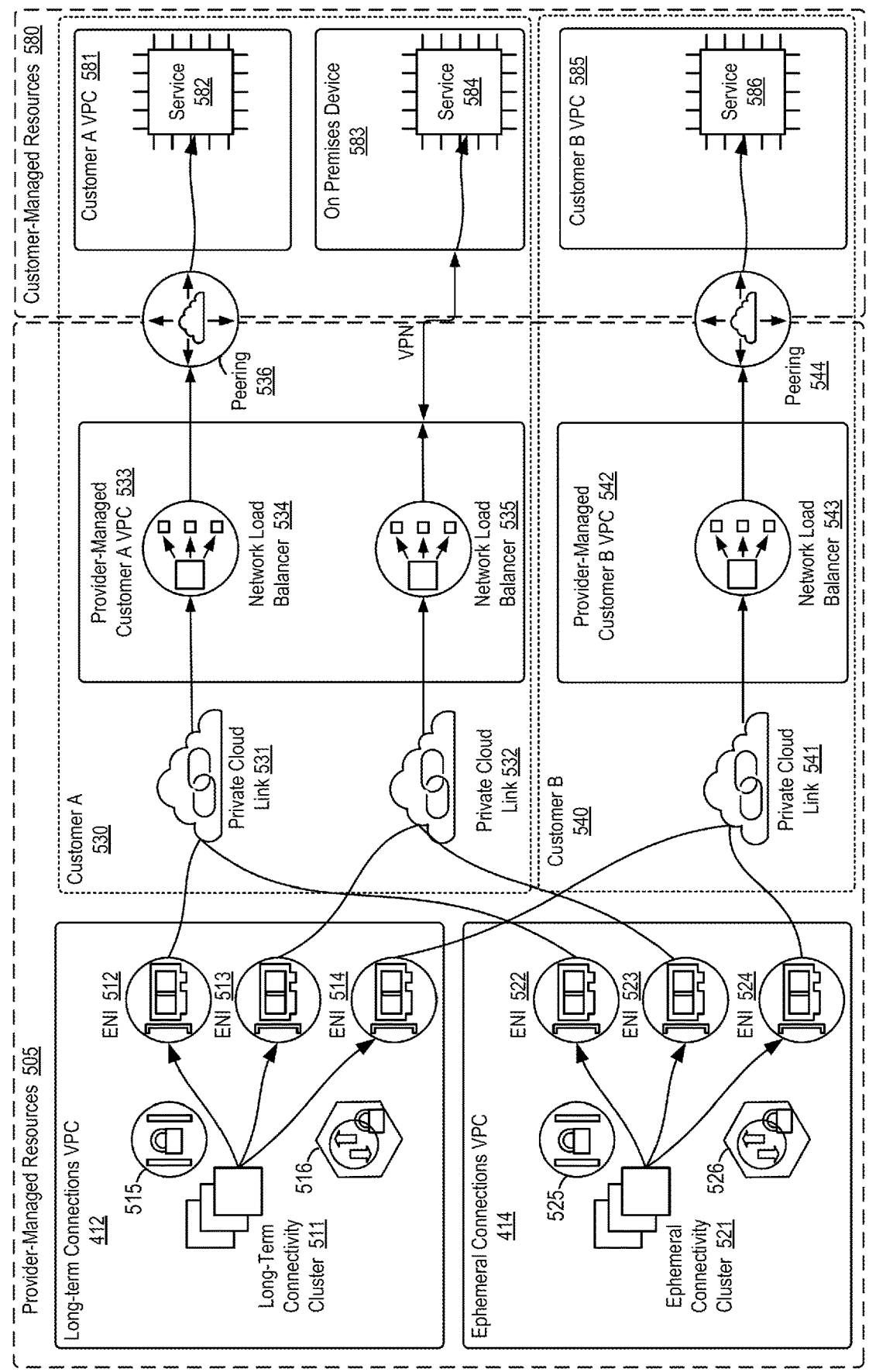
FIG. 7 is a functional block diagram of a scenario in which two different customers have enabled access to their private resources, according to some example implementations.

FIG. 7 is a functional block diagram of a scenario in which two different customers have enabled access to their private resources, according to some example implementations. The customers are Customers A and B. The figure depicts Provider-Managed Resources 505 and Customer-Managed Resources 580. The Provider-Managed Resources 505 include the Long-Term Connections VPC 412 and the Ephemeral Connections VPC 414. The Long-Term Connections VPC 412 includes a Long-Term Connectivity Cluster 511, represented by three overlapping squares, and ENIs 512, 513 and 514. The squares represent different instances of a computing device. Generally, one ENI may be used for each connection to a private resource which is accessed.

Here, for the Long-Term Connections VPC 412, the ENIs 512, 513 and 514 are used to access the services 582, 584 and 586, respectively.

Similarly, the Ephemeral Connections VPC 414 includes an Ephemeral Connectivity Cluster 521, represented by three overlapping squares, and ENIs 522, 523 and 524.

Here, for the Ephemeral Connections VPC 414, the ENIs 522, 523 and 524 are used to access the services 582, 584 and 586, respectively.

The symbols 515 and 525 denote a network access list and the symbols 516 and 526 denote network policies. These are technologies for controlling access to the private resources, and have a function which is similar to opening and closing a gate to the private resources. One or both can be used.

A Customer A region 530) encompasses portions of the Provider-Managed Resources 505 and Customer-Managed Resources 580. It includes a Private Cloud Link 531 which communicates with the ENIs 512 and 522, and a Private Cloud Link 532 which communicates with the ENIs 513 and 523. The Customer A region further includes a Provider-Managed Customer A VPC 533, which, in turn, includes Network Load Balancers 534 and 535. The Network Load Balancer 534 has a VPC peering connection 536 with a Service 582 in a Customer A VPC 581. The Network Load Balancer 534 communicates via a VPN with a Service 584 in the On-Premised Device 583.

A Customer B region 540) encompasses portions of the Provider-Managed Resources 505 and Customer-Managed Resources 580. It includes a Private Cloud Link 541 which communicates with the ENIs 514 and 524. The Customer B region further includes a Provider-Managed Customer B VPC 542, which, in turn, includes a network load balancer 543. The network load balancer 543 has a VPC peering connection 544 with a Service 586 in a Customer B VPC.

The private cloud links are resources, e.g., private URLs, which allow exposing a domain, which is not publicly accessible. Only the ENIs have access to the private URLs. They expose access to the private resources.

Customer-Managed Resources 580) are also depicted. These Resources 580) are associated with Customer A or B. For Customer A, the Resources include the Customer A VPC 581 which provides the respective Service 582 and the On-Premises device 583, which provides the respective Service 584. As discussed, the Service 582 communicates with the Network Load Balancer 534 via the VPC peering connection 536, and the Service 584 communicates with the Network Load Balancer 535 via a VPN.

For Customer B, the Resources 580) include the Customer B VPC 585, which provides the respective Service 586. The Service 586 communicates with the Network Load Balancer 543 via the VPC peering connection 544, as mentioned.

A peering connection or VPN can be used based on whether the resources are in a VPC on in on-premises equipment, respectively.

In further detail, the diagram describes two different customers that have enabled access to their private resources with for both Design and Productive moments of the Integration development. For each private resource declared by the customer, a PrivateLink and its required network load balancer (NLB) may be deployed. The Private Cloud Link endpoint will be added to the solution's VPCs. This will add an ENI into the VPC for access to it. Network Access Control Lists (NACLs) and/or Network Policies can be used to allow/deny traffic from each pod.

By updating the NACLs and/or Network Policies from a management service, the access to the private resources is managed in an instant way. The management service may live inside each of the Kubernetes Clusters (MDS and Composer in the above diagram) which also provide the monitoring and governance features described previously in step I (Configuring Access To The Privately Owned Resource) and will make sure all required resources are deleted once the access to the private resource is no longer allowed.

FIG. 8A is a functional block diagram for cluster-level dynamic access to private resource management, where an Integration A is used to access or add a Private Resource1 while access to a Private Resource2 is blocked, according to some example implementations. An Integration User 605 can trigger an integration execution/design operation with an Integration-Platform-Executor 610 via a path 601, or add a private resource to an integration using an Integration-Platform-Manager 611 via a path 602.

When the path 601 is used, the Integration-Platform-Executor 610 can execute an integration/design operation using a selected integration in the cluster 620. In this example, the selected integration is Integration A 621 and it is used to access an associated Private Resource1. In other words, a first integration is used to access a first private resource. In this case, the Integration-Platform-Executor 610) notifies the Private-Resource-Controller-Service 623 that access to Private Resource1 is requested. In response to this notification, the Private-Resource-Controller-Service 623 configures a path 625 which allows the Integration A to access the Private Resource1.

The Private-Resource-Controller-Service 623 creates and manages the network access lists and network policies discussed in connection with FIG. 7. It is deployed in each cluster where the integration runs.

The Private-Resource-Controller-Service 623 also configures one or more remaining paths to prevent one or more other integrations from accessing one or more other private resources. For example, the path 626 is blocked, as indicated by the X icon 624, to prevent the Integration B from accessing the Private Resource2 631.

When the path 602 is used, the Integration-Platform-Manager 611 accesses the Private-Resource-Management-Service 125, which has the associated Storage 130, as discussed previously. The Private-Resource-Management-Service 125 notifies the Private-Resource-Controller-Service 623 that a new private resource, e.g., Private Resource1, is to be added. In response to this notification, the Private-Resource-Controller-Service 623 configures the path 625 to allow the Integration A to add the Private Resource1. As before, the path 626 is blocked, as indicated by the X icon 624.

FIG. 8B is a functional block diagram for cluster-level dynamic access to private resource management, where an Integration B is used to access or add a Private Resource2 while access to a Private Resource1 is blocked, according to some example implementations.

In other words, a second integration is used to access a second private resource. In this case, the Integration-Platform-Executor 610 notifies the Private-Resource-Controller-Service 623 that access to Private Resource2 is requested. In response to this notification, the Private-Resource-Controller-Service 623 configures the path 626 which allows the Integration B to access the Private Resource2. The Private-Resource-Controller-Service 623 also configures one or more remaining paths to prevent one or more other integrations from accessing one or more other private resources.

For example, the path 625 is blocked, as indicated by the X icon 627, to prevent the Integration A from accessing the Private Resource1 630.

When the path 602 is used, the Integration-Platform-Manager 611 accesses the Private-Resource-Management-Service 125. In response, the Private-Resource-Management-Service 125 notifies the Private-Resource-Controller-Service 623 that a new private resource, e.g., Private Resource2, is to be added. In response to this notification, the Private-Resource-Controller-Service 623 configures the path 626 to allow the Integration B to add the Private Resource2, and the path 625 is blocked, as indicated by the X icon 627.

Figure 9:
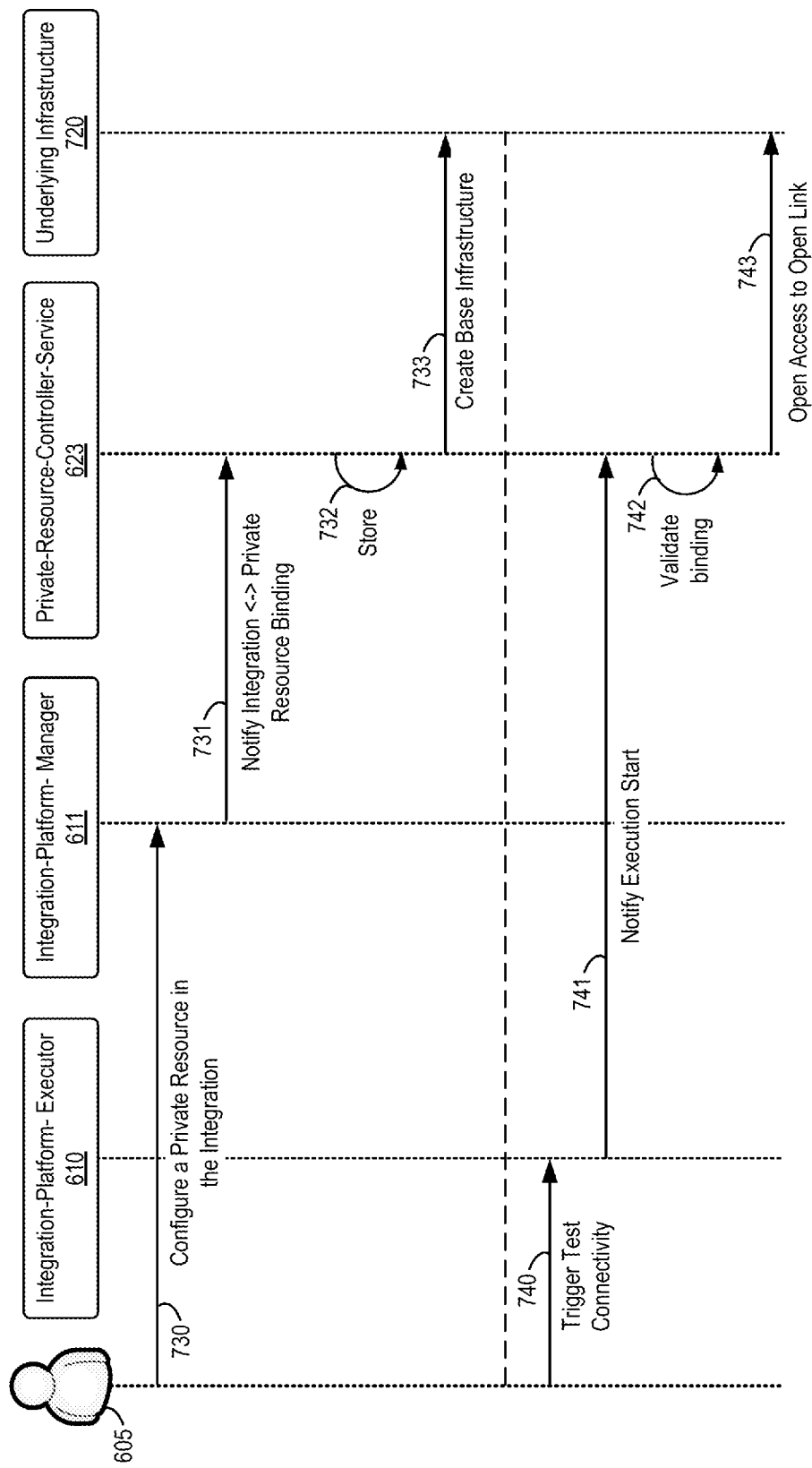
FIG. 9 is a process diagram that depicts an example sequence of validation and opening the access to a private resource, consistent with FIGS. 6A and 6B, according to some example implementations.

FIG. 9) is a process diagram that depicts an example sequence of validation and opening the access to a private resource, consistent with FIGS. 6A and 6B, according to some example implementations. The sequence applies to all use cases, in one possible approach. The sequence includes the Integration User 605, the Integration-Platform-Executor 610, the Integration-Platform-Manager 611, the Private Resources Controller Service 623 and Underlying Infrastructure 720. The infrastructure may be network infrastructure, e.g., the hardware and software that enables network connectivity and communication between users, devices, applications and the internet.

The portion of the figure above the horizontal dashed line involves how a private resource is configured. The portion of the figure below the horizontal dashed line involves a subsequent design operation involving the configured private resource.

When path 602 is used, the user's device contacts the Integration-Platform-Manager 611 (arrow 730) to configure/add a private resource in the integration. Subsequently, the Integration-Platform-Manager 611 contacts the Private-Resource-Controller-Service 623 (arrow 731) to notify the integration and perform a private resource binding. The results of this step are stored (arrow 732), and the Private-Resource-Controller-Service 623 creates a base infrastructure (arrow 733), e.g., a load balancer, VPC, and/or private link.

When path 601 is used, the user device triggers a test connectivity (arrow 740) with the Integration-Platform-Executor 610. This can be, e.g., to verify the user's credentials or to validate the functioning of the private resource. The Integration-Platform-Executor 610 then contacts the Private-Resource-Controller-Service 623 to notify it of the start of execution. The Private-Resource-Controller-Service 623 validates the binding (arrow 742) and opens access to the open link (arrow 743). The validating can including access information, e.g., access lists and network policies, regarding which integration can connect to which private resource.

Generally, there are two main information flows which may be used to enable access to the user's private resources. In a first information flow, the user selects an already configured private resource to be used inside an integration. An integration is composed of steps that fetch and transform information, thus connecting multiple services. With this solution now a step can be configured to access a private resource instead of the regular public resources (such as Slack, Salesforce or other public APIs). At this point, the association between an integration and a private resource is notified to the Private-Resource-Controller-Service 623 so it will know to give access to the integration whenever it is executed.

In a second information flow, after an integration has one or more private resources and either a Design Operation or an execution is triggered, then the Private-Resource-Controller-Service 623 is notified so the connection to the private resource is opened inside the Cluster 620 using the Network Policies or NACLs at the cluster level, and the connection is closed soon after so no pod can access the connection when unused.

Figure 10:
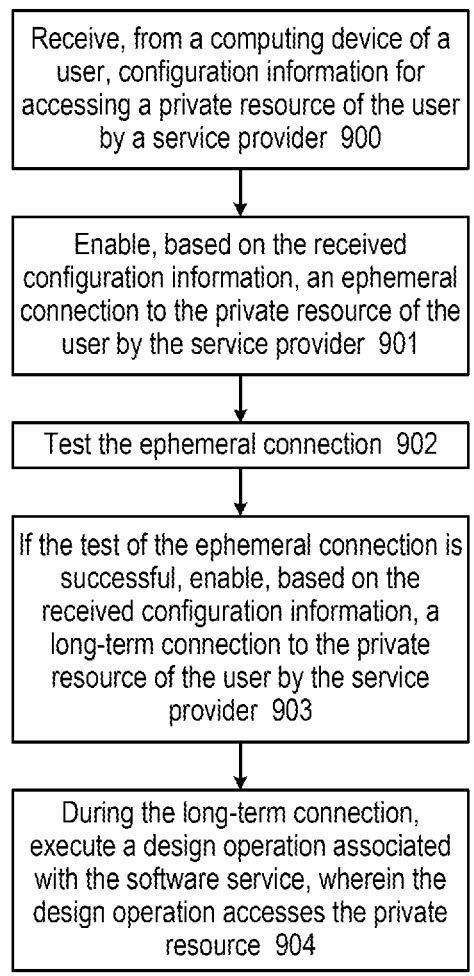
FIG. 10 depicts a flowchart of an example method for enabling a user to access private resources, according to some example implementations.

FIG. 10 depicts a flowchart of an example method for enabling a user to access private resources, according to some example implementations. Step 900 includes receiving, from a computing device of a user, configuration information for accessing a private resource of the user by a service provider. Step 901 includes enabling, based on the received configuration information, an ephemeral connection to the private resource of the user by the service provider. Step 902 includes testing the ephemeral connection. Step 903 includes, if the test of the ephemeral connection is successful, enabling, based on the received configuration information, a long-term connection to the private resource of the user by the service provider. Step 904 includes during the long-term connection, executing a design operation associated with the software service, wherein the design operation accesses the private resource.

For example, the test can involve validating the user's login credentials, where the test is successful if the credentials are found to be valid such that the user gains access to the private resource. The test could also involve validating functioning of the private resource. If the test (or tests) of the ephemeral connection is/are unsuccessful, the long-term connection to the private resource is not enabled and an error message may be generated for the user.

Use Cases

Use Case 1: Ephemeral Integration Execution

First the customer will access the UIs 150 and 160 of the Private Resources Management UI to configure the access to the private resource. If the private resource is in a VPC, the user can provide configuration information such as: Cloud Identifier, Account Identifier, VPC Identifier and a Classless Inter-Domain Routing (CIDR) block of the VPC. CIDR is a method for allocating IP addresses and for IP routing.

If the private resource is behind a VPN, the user can provide: VPN provider, Server name or address and sign-in information.

All resources to enable access, such as the ENI, the PrivateLink and the Network Load Balancer, are generated as soon as the customer finishes the private resource registration, but since NACLs and/or Network Policies are not yet configured, so that there is no access to the private resource. By default, nothing is accessible.

The Customer then goes to the Integration Platform and starts building an Integration. As part of it, the customer will declare steps that may require access to public or private APIs. For example they may select a step that has the ability to send a message to Slack, then a connection to Slack is configured. The customer will see their private resource as one of the options to configure a step, as a separate icon from a public software-as-a-service (Saas). When the customer selects a private resource when configuring a step, then it will automatically give permission for this integration so when an execution of it requires it, the access to the private resource is enabled.

After a private resource connection is selected for a step, immediately a design operation of the type Test Connectivity is triggered (arrow 740).

This request goes to the ephemeral connections cluster (e.g., MDS) which solves Design Operations and will assign a specific pod with a specific Integration Runtime (e.g. Mule Runtime) to execute the operation.

Before the operation gets executed, the solution's Private-Resource-Controller-Service 623 hook (e.g., web socket, event queue or any other notification pattern) detects the need to access a private resource because it listens to the Private-Resources-Management-Service 125 which was already notified of an Integration and a Private Resource being linked.

Based on the stored mapping of integrations and private resources, it validates the authentication and authorization of the user based on the request and then enables access to the private resource using NACLs and/or Network Policies.

Security: The authentication and authorization of the user can be handled, e.g., using OAuth 2.0, an industry-standard protocol for authorization, or a better-known strategy, which means each request will have a token that helps identify the user and the level of access they have. This way, both the controller-service and an authentication-service validate the access of the user to the private resource.

Accessibility: The integration may change places or may have more than one instance based on the established strategies of a highly-virtualized environment (e.g., Kubernetes), so that the controller-service is in-sync using the underlying API (e.g., Kubernetes API) to know exactly how to configure the NACLs and/or Network Policies without generating any downtime to the connection (e.g., the connection may change from one physical node to another transparently).

High Availability: If an integration is deployed with multiple replicas, then the controller-service will be in charge of providing connectivity to all instances. This requires no extra work since NACLs and Network Policies can be configured per an identifying trait (e.g., Kubernetes labels) which prevents having to do individual management of each instance.

Failure Management: If the operation of the integration fails (e.g., a Design Operation is misconfigured and the API is not properly used, or the response not properly valid) the execution is considered to be over in the same way execution of a successful path is considered to be over, and the connectivity to the private resource is instantly severed. In other words, the presence of an error results in the immediate termination of the connection and the customer/user needs to explicitly retry for the secure connection to be reopened, thus providing full governance over the activity. Certain scenarios may allow the customer/user to configure an automatic retry strategy (e.g., such as in response to an API returning 429) but that will also be governed by the customer and will execute inside the integration automatically. The Hypertext Transfer Protocol (HTTP) 429 Too Many Requests response status code indicates the user has sent too many requests in a given amount of time If all goes well, the Integration Runtime assigned to the customer then starts up an artifact to solve the Test Connectivity operation with the private link domain of the private resource already configured by the controller-service.

Once the underlying connector makes the request to validate the connection against the private resource, the request is routed with the use of the ENI through the Private Link to the Network Load Balancer, with use of the VPC peering or VPN access configuration and finally reaching the Private Resource in a transparent manner.

The Design Operation is successfully solved and the response returned by the Mule Runtime.

At this point, the Private-Resource Controller-Service 623 detects the end of the operation and configures back the NACLs and/or Network Policies to their original state of disallowing access to all.

The Customer then receives the success of the Design Operation by having had the access to their private resource only available to a very specific pod and integration for the smallest time period possible.

Use Case 2: Long-Term Integration Execution

A customer clicks on an "Activate" button in a UI once they are happy with the state of their integration, aiming to have that integration running without end, e.g., long-term.

An Integration application is generated based on what the user has generated.

Inside the Application, all references to the different private resources are replaced with the already generated Private Link of it since the Customer already registered his private resource as described above.

A pod is generated and assigned to the Flow/Integration with a dedicated Integration Runtime (e.g. Mule Runtime) where the Integration Artifact is deployed.

Through NACLs and/or Network Policies, the pod is given access to the Private Link associated with the private resource. This is done by the controller-service once it gets notice from the management-service that the integration is going live.

The platform provides monitoring through existing tooling located inside the Mule Runtime pod.

The Integration will then have access to the customer's private resources until one of these events happen: customer decides to "Deactivate" the Integration, customer deletes the private resource from the management screen, customer disallows this specific Flow from having access to the Private Resource, customer subscription is over and thus we deactivate all of their integrations, or Monitoring over the private resource connectivity allows detection of: a Distributed Denial of Service (DDoS), a Circuit Breaker strategy, a retry strategy or a Bulkhead configuration.

DDOS can be detected if there is an abuse of the connection (e.g., too many requests from a single integration in a certain period of time). A Circuit Breaker strategy can be enforced if the error rate of the private resource connectivity goes beyond a certain threshold (e.g. 50%) which can help prevent having the service at capacity.

A retry strategy with back off and jitter can be configured for certain status codes or use cases by the customer (e.g., an HTTP 429 status code) so requests over the private resource are re-attempted.

A Bulkhead configuration can limit the max number of concurrent requests flying over the private link to have a control over the number of requests being processed at any given time.

When this happens, the configuration at the Kubernetes level is removed, so the Private Link is no longer accessible by that pod. In the event of a Deactivation, the pod is also destroyed.

Example Electronic Devices and Environments

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read-only memory (ROM). Flash memory, phase change memory, solid state drives (SSDs) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals-such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios. "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 11:
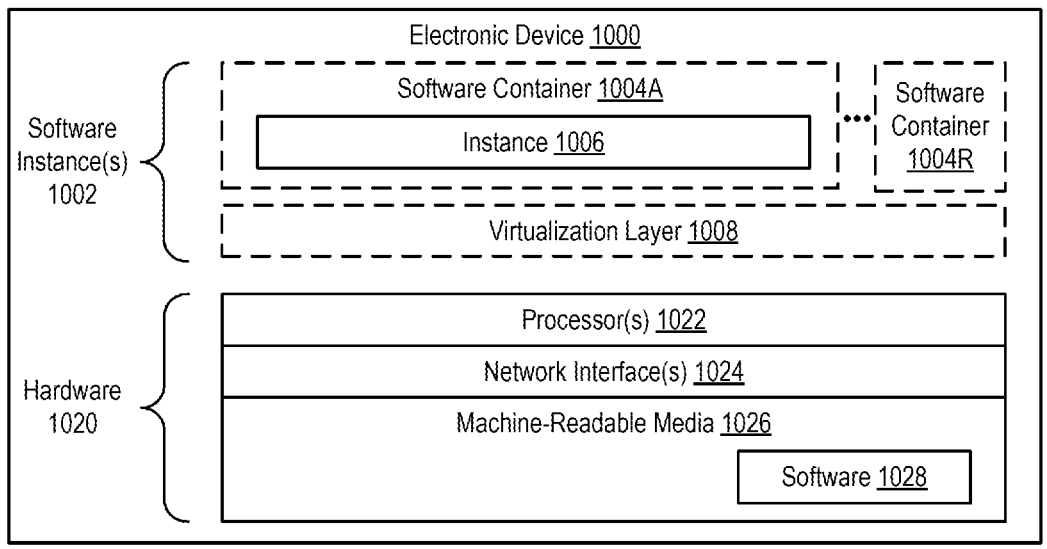
FIG. 11 is a functional block diagram illustrating an electronic device 1000 according to some example implementations.

FIG. 11 is a block diagram illustrating an electronic device 1000 according to some example implementations. One or more of such electronic devices can host the processes and components depicted in FIG. 1, including the user computing device, the server and the networks.

FIG. 11 includes hardware 1020 comprising a set of one or more processor(s) 1022, a set of one or more network interfaces 1024 (wireless and/or wired), and machine-readable media 1026 having stored therein software 1028 (which includes instructions executable by the set of one or more processor(s) 1022). The machine-readable media 1026 may include tangible, non-transitory and/or transitory machine-readable media or medium. Each of the previously described user computing devices and the process for providing access to private resources may be implemented in one or more electronic devices 1000.

In one implementation: 1) each of the user computing devices and servers is implemented in a separate one of the electronic devices 1000 (e.g., in end user devices where the software 1028 represents the software to implement clients to interface directly and/or indirectly with the process for providing access to private resources (e.g., software 1028 represents a web browser, a native client, a portal, a command-line interface, and/or an application programming interface (API) based upon protocols such as Simple Object Access Protocol (SOAP), Representational State Transfer (REST), etc.); 2) the process for providing access to private resources is implemented in a separate set of one or more of the electronic devices 1000 (e.g., a set of one or more server devices where the software 1028 represents the software to implement the process for providing access to private resources); and 3) in operation, the electronic devices implementing the user computing devices and servers and the process for providing access to private resources would be communicatively coupled (e.g., by a network) and would establish between them (or through one or more other layers and/or or other services) connections for communicating data. Other configurations of electronic devices may be used in other implementations (e.g., an implementation in which the user computing device and the process for providing access to private resources are implemented on a single one of electronic device 1000).

During operation, an instance of the software 1028 (illustrated as instance 1006 and referred to as a software instance; and in the more specific case of an application, as an application instance) is executed. In electronic devices that use compute virtualization, the set of one or more processor(s) 1022 typically execute software to instantiate a virtualization layer 1008 and one or more software container(s) 1004A-1004R (e.g., with operating system-level virtualization, the virtualization layer 1008 may represent a container engine (such as Docker Engine by Docker, Inc. or rkt in Container Linux by Red Hat, Inc.) running on top of (or integrated into) an operating system, and it allows for the creation of multiple software containers 1004A-1004R (representing separate user space instances and also called virtualization engines, virtual private servers, or jails) that may each be used to execute a set of one or more applications; with full virtualization, the virtualization layer 1008 represents a hypervisor (sometimes referred to as a virtual machine monitor (VMM)) or a hypervisor executing on top of a host operating system, and the software containers 1004A-1004R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 1028 is executed within the software container 1004A on the virtualization layer 1008. In electronic devices where compute virtualization is not used, the instance 1006 on top of a host operating system is executed on the "bare metal" electronic device 1000. The instantiation of the instance 1006, as well as the virtualization layer 1008 and software containers 1004A-1004R if implemented, are collectively referred to as software instance(s) 1002.

Alternative implementations of an electronic device may have numerous variations from that described above. For example, customized hardware and/or accelerators might also be used in an electronic device.

Example Environment

Figure 12:
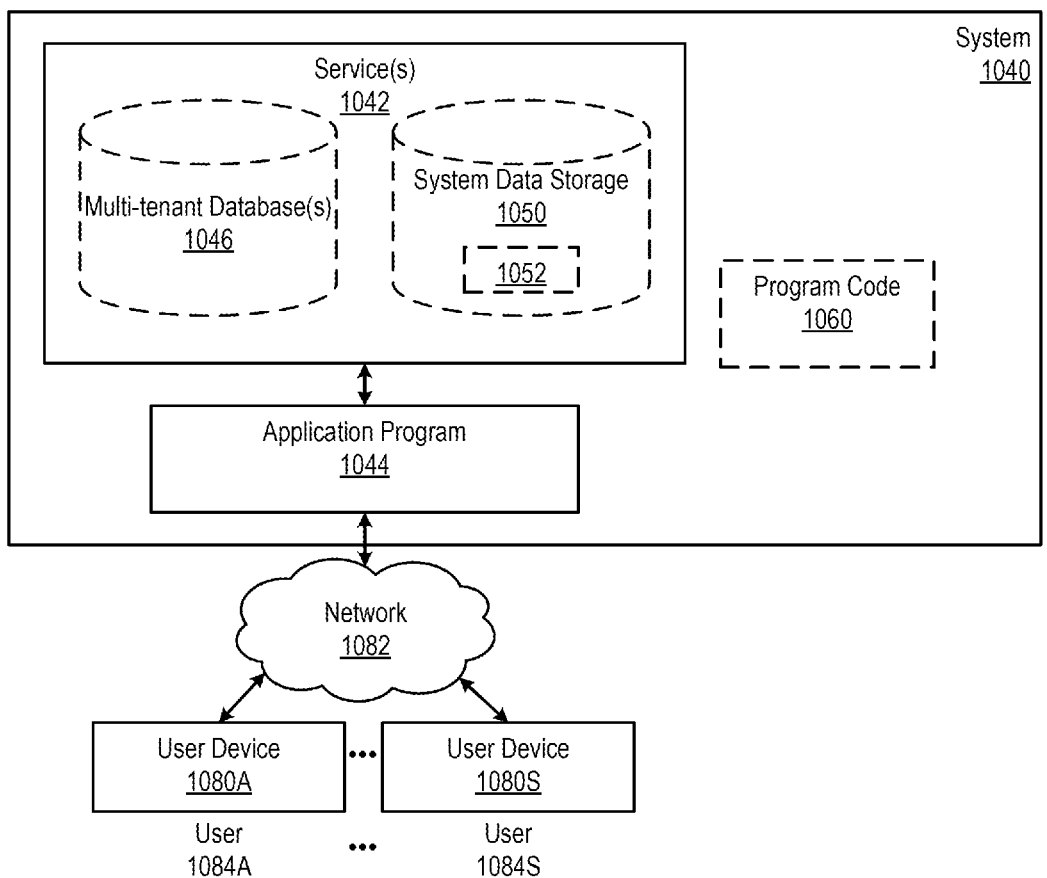
FIG. 12 is a functional block diagram of a deployment environment according to some example implementations.

FIG. 12 is a block diagram of a deployment environment according to some example implementations. A system 1040 includes hardware (e.g., a set of one or more server devices) and software to provide service(s) 1042, including the process for providing access to private resources. In some implementations the system 1040 is in one or more datacenter(s). These datacenter(s) may be: 1) first party datacenter(s), which are datacenter(s) owned and/or operated by the same entity that provides and/or operates some or all of the software that provides the service(s) 1042; and/or 2) third-party datacenter(s), which are datacenter(s) owned and/or operated by one or more different entities than the entity that provides the service(s) 1042 (e.g., the different entities may host some or all of the software provided and/or operated by the entity that provides the service(s) 1042). For example, third-party datacenters may be owned and/or operated by entities providing public cloud services (e.g., Amazon.com, Inc. (Amazon Web Services). Google LLC (Google Cloud Platform). Microsoft Corporation (Azure)).

The system 1040 is coupled to user devices 1080A-1080S over a network 1082. The service(s) 1042 may be on-demand services that are made available to one or more of the users 1084A-1084S working for one or more entities other than the entity which owns and/or operates the on-demand services (those users sometimes referred to as outside users) so that those entities need not be concerned with building and/or maintaining a system, but instead may make use of the service(s) 1042 when needed (e.g., when needed by the users 1084A-1084S). The service(s) 1042 may communicate with each other and/or with one or more of the user devices 1080A-1080S via one or more APIs (e.g., a REST API). In some implementations, the user devices 1080A-1080S are operated by users 1084A-1084S, and each may be operated as a client device and/or a server device. In some implementations, one or more of the user devices 1080A-1080S are separate ones of the electronic device 1000 or include one or more features of the electronic device 1000.

In some implementations, the system 1040 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 1040 is a multi-tenant cloud computing architecture supporting multiple services, such as one or more of the following types of services; process for providing access to private resources; Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 1040 may include an application platform 1044 that enables PAAS for creating, managing, and executing one or more applications developed by the provider of the application platform 1044, users accessing the system 1040 via one or more of user devices 1080A-1080S, or third-party application developers accessing the system 1040 via one or more of user devices 1080A-1080S.

In some implementations, one or more of the service(s) 1042 may use one or more multi-tenant databases 1046, as well as system data storage 1050 for system data 1052 accessible to system 1040. In certain implementations, the system 1040 includes a set of one or more servers that are running on server electronic devices and that are configured to handle requests for any authorized user associated with any tenant (there is no server affinity for a user and/or tenant to a specific server). The user devices 1080A-1080S communicate with the server(s) of system 1040 to request and update tenant-level data and system-level data hosted by system 1040, and in response the system 1040 (e.g., one or more servers in system 1040) automatically may generate one or more Structured Query Language (SQL) statements (e.g., one or more SQL queries) that are designed to access the desired information from the multi-tenant database(s) 1046 and/or system data storage 1050.

In some implementations, the service(s) 1042 are implemented using virtual applications dynamically created at run time responsive to queries from the user devices 1080A-1080S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 1060 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 1044 includes an application setup mechanism that supports application developers' creation and management of applications, which may be saved as metadata by save routines. Invocations to such applications, including the process for providing access to private resources, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 1082 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4th generation wireless protocol (4G) (e.g., the Long Term Evolution (LTE) standard, LTE Advanced. LTE Advanced Pro), a fifth generation wireless protocol (5G), and/or similar wired and/or wireless protocols, and may include one or more intermediary devices for routing data between the system 1040 and the user devices 1080A-1080S.

Each user device 1080A-1080S (such as a desktop personal computer, workstation, laptop. Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 1040. For example, the user interface device can be used to access data and applications hosted by system 1040, and to perform searches on stored data, and otherwise allow one or more of users 1084A-1084S to interact with various GUI pages that may be presented to the one or more of users 1084A-1084S. User devices 1080A-1080S might communicate with system 1040 using TCP/IP (Transfer Control Protocol and Internet Protocol) and, at a higher network level, use other networking protocols to communicate, such as Hypertext Transfer Protocol (HTTP). File Transfer Protocol (FTP). Andrew File System (AFS). Wireless Application Protocol (WAP). Network File System (NFS), an application program interface (API) based upon protocols such as Simple Object Access Protocol (SOAP), Representational State Transfer (REST), etc. In an example where HTTP is used, one or more user devices 1080A-1080S might include an HTTP client, commonly referred to as a "browser." for sending and receiving HTTP messages to and from server(s) of system 1040, thus allowing users 1084A-1084S of the user devices 1080A-1080S to access, process and view information, pages and applications available to it from system 1040 over network 1082.

Conclusion

In the above description, numerous specific details such as resource partitioning/sharing/duplication implementations, types and interrelationships of system components, and logic partitioning/integration choices are set forth to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation." "an implementation." "an example implementation." etc. . . . indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A computer system for providing access to a resource, comprising:
   a processor; and
   a memory coupled to the processor and storing instructions that, when executed by the processor, are configurable to cause the computer system to:
   receive, from a computing device of a user, configuration information for accessing a private resource of the user by a service provider;
   establish, based on the received configuration information, an ephemeral connection to the private resource of the user by the service provider, the ephemeral connection having a limited duration;

test the ephemeral connection;

in response to the test of the ephemeral connection being successful, establish, based on the received configuration information, a long-term connection to the private resource of the user by the service provider, the long-term connection being different from and having a longer duration than the ephemeral connection; and during the long-term connection, execute a design operation associated with a software service, wherein the design operation accesses the private resource.

2. The computer system of claim 1, wherein to establish the ephemeral connection and the long-term connection, the computer system is configured to implement an integration platform to connect the computing device of the user to the private resource.

3. The computer system of claim 1, wherein the private resource is accessed by the service provider via an application programming interface (API).

4. The computer system of claim 1, wherein the private resource is hosted on a private network associated with the user.

5. The computer system of claim 1, wherein the memory further stores instructions to provide, on the computing device of the user, a user interface that enables the user to do at least one of: enable or disable access to the private resource, monitor current and historical usage of the private resource, or identify integrations currently accessing the private resource.

6. The computer system of claim 5, wherein the current and historical usage of the private resource includes at least one of: a number of times the private resource has been called, a number of errors that have occurred in calling the private resource, a response time of a payload, a number of integrations with access to the private resource, or a number of integrations with an active link to the private resource.

7. The computer system of claim 1, wherein the establishing the ephemeral connection and the long-term connection to the private resource includes deploying a private cloud link to a virtual private cloud (VPC).

8. The computer system of claim 7, wherein the establishing the ephemeral connection and the long-term connection to the private resource includes deploying a network load balancer (NLB) in conjunction with the private cloud link.

9. The computer system of claim 7, wherein the establishing the ephemeral connection and the long-term connection to the private resource includes deploying an elastic network interface (ENI), and the VPC is accessed via the private cloud link using the ENI.

10. The computer system of claim 1, wherein the establishing the ephemeral connection and the long-term connection to the private resource includes updating at least one of a network access control list (NACL) or a network policy.

11. The computer system of claim 1, wherein the received configuration information includes at least one of: a cloud identifier, an account identifier, a VPC identifier, or a classless inter-domain routing (CIDR) block identifier.

12. The computer system of claim 1, wherein the private resource is behind a virtual private network (VPN), and the received configuration information includes at least one of: a VPN provider identifier, a server name, a server address, or sign-in information for the VPN.

13. The computer system of claim 1, wherein executing the design operation includes assigning a pod of computing resources to execute the design operation.

14. The computer system of claim 1, wherein executing the design operation includes providing authentication and authorization information to access the private resource.

15. The computer system of claim 14, wherein the test of the ephemeral connection includes validating a login credential of the user.

16. The computer system of claim 14, wherein the test of the ephemeral connection includes validating functioning of the private resource.

17. The computer system of claim 1, wherein the long-term connection to the private resource remains active until deletion of the private resource by the user via a user interface of the computing device of the user or until the user denies permission given previously to an integration to access to the private resource.

18. The computer system of claim 1, wherein the ephemeral connection to the private resource is used to execute a portion of an integration and the long-term connection to the private resource is used to execute an entirety of the integration.

19. A non-transitory computer-readable medium for providing access to a resource, the medium storing instructions that, when executed by a computer system, are configurable to cause the computer system to:

receive, from a computing device of a user, configuration information for accessing a private resource of the user by a service provider;

establish, based on the received configuration information, an ephemeral connection to the private resource of the user by the service provider, the ephemeral connection having a limited duration;

test the ephemeral connection;

in response to the test of the ephemeral connection being successful, establish, based on the received configuration information, a long-term connection to the private resource of the user by the service provider, the long-term connection being different from and having a longer duration than the ephemeral connection; and during the long-term connection, execute a design operation associated with a software service, wherein the design operation accesses the private resource.

20. A method for providing access to a resource, comprising:

receiving, from a computing device of a user, configuration information for accessing a private resource of the user by a service provider;

establishing, based on the received configuration information, an ephemeral connection to the private resource of the user by the service provider, the ephemeral connection having a limited duration;

testing the ephemeral connection;

in response to the testing of the ephemeral connection being successful, enabling, based on the received configuration information, a long-term connection to the private resource of the user by the service provider, the long-term connection being different from and having a longer duration than the ephemeral connection; and during the long-term connection, executing a design operation associated with a software service to access the private resource.

* * * * *